Sept. 15, 1925.

M. SWANSON

CORN HUSKER

Filed July 5, 1923

Inventor:
Martin Swanson
By H.P. Doolittle,
Atty

Sept. 15, 1925.
M. SWANSON
CORN HUSKER
Filed July 5, 1923
1,553,572
2 Sheets-Sheet 2
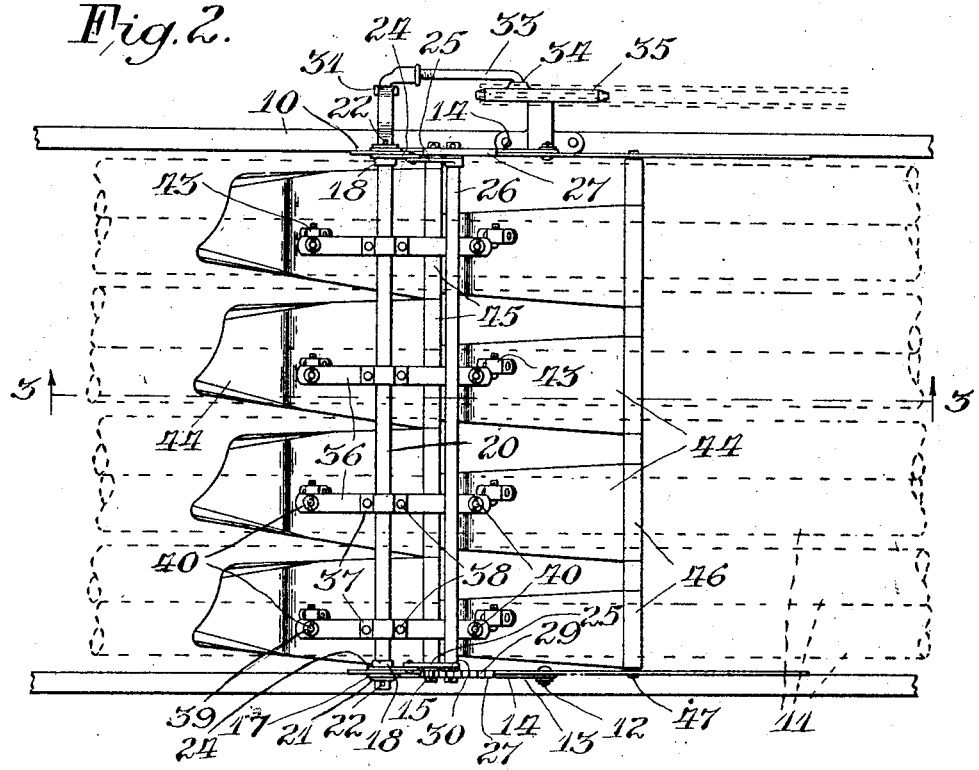
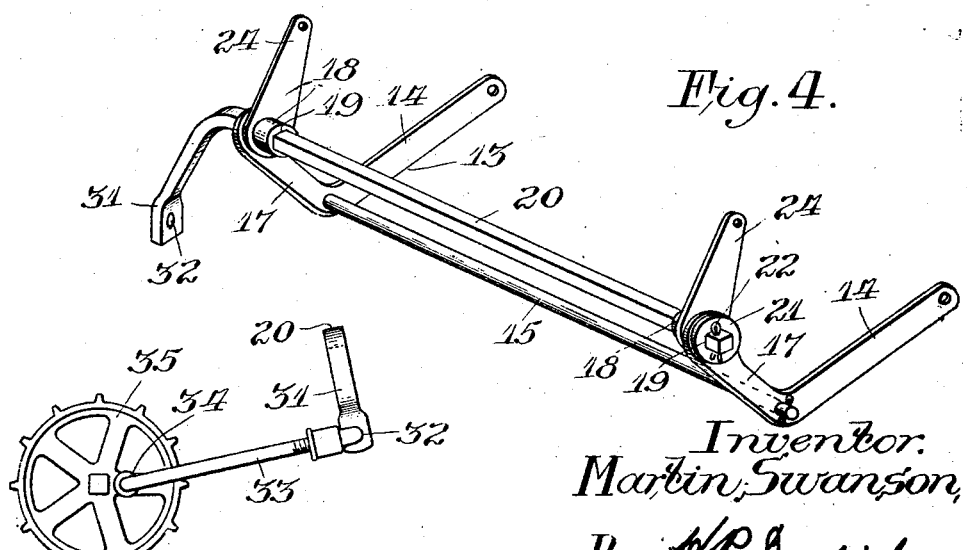
Inventor.
Martin Swanson,
By H. P. Darlind
Atty.

Patented Sept. 15, 1925.

1,553,572

UNITED STATES PATENT OFFICE.

MARTIN SWANSON, OF CHICAGO, ILLINOIS, ASSIGNOR TO INTERNATIONAL HARVESTER COMPANY, OF CHICAGO, ILLINOIS, A CORPORATION OF NEW JERSEY.

CORN HUSKER.

Application filed July 5, 1923. Serial No. 649,454.

*To all whom it may concern:*

Be it known that I, MARTIN SWANSON, a citizen of the United States, residing at Chicago, in the county of Cook and State of Illinois, have invented certain new and useful Improvements in Corn Huskers, of which the following is a full, clear, and exact specification.

My invention relates to corn huskers and in particular to a combined ear agitator and retarding mechanism whereby the ears are directed against the husking rollers substantially parallel with the axes of three rollers and yieldingly held in engagement therewith.

One of the objects of the present invention is to provide a mechanism simple in construction and efficient in operation.

A further object is to provide an improved mechanism in which the function of an agitator as well as that of a retarder is combined in a single device.

A still further object is to provide an improved means for adjusting a plurality of retarders or agitators.

These and other objects are attained by providing a construction and an arrangement of the various parts in the manner hereinafter described and particularly pointed out in the appended claims.

Referring to the drawings—

Fig. 3 is a cross-sectional view taken on the line 3—3 in Fig. 2;

Fig. 4 is an enlarged perspective view of the rocking frame; and

Fig. 5 is an enlarged detail view showing the driving mechanism for actuating the rocker shaft.

Figure 1:
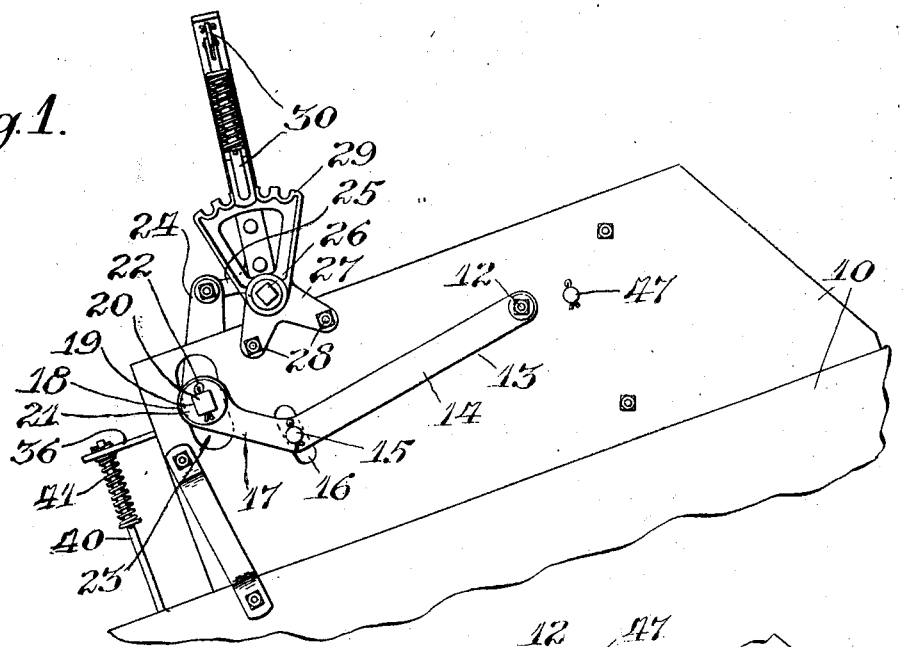
Fig. 1 is a side elevational view of a portion of the husking machine showing my improved device embodied therein.
Figure 2:
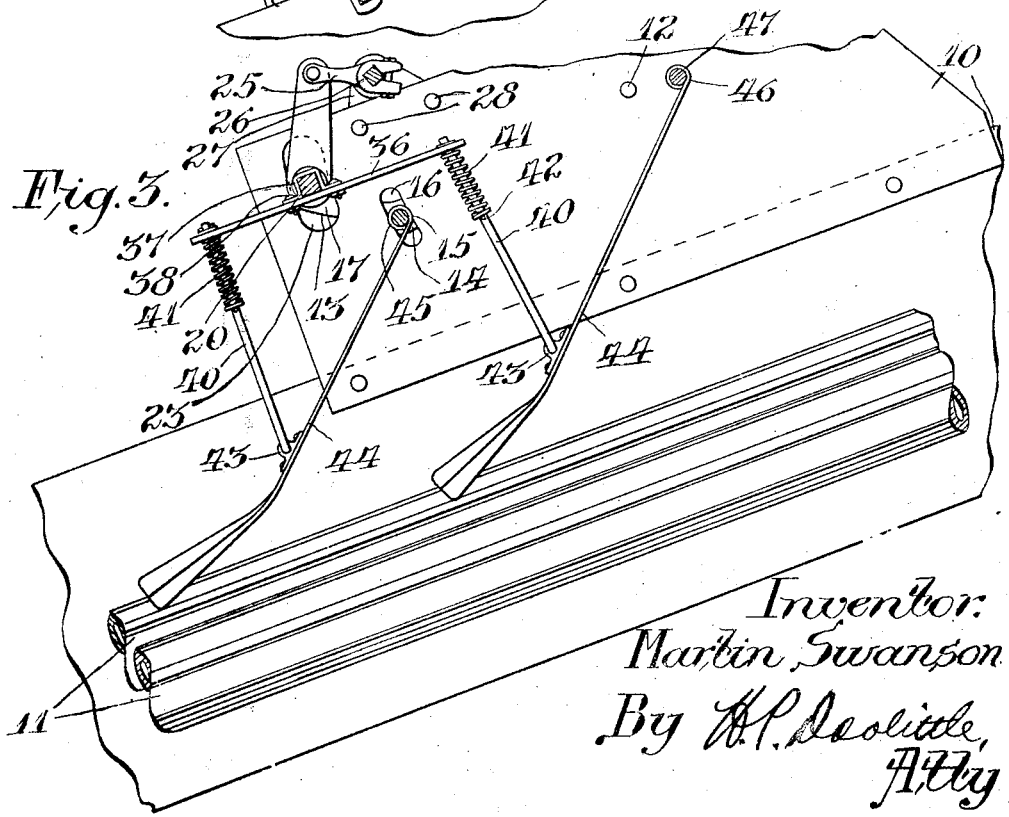
Fig. 2 is a top plan view of Fig. 1.

For the purposes of illustration, I have shown my improved agitator and retarding mechanism embodied in a husking machine which comprises the usual main frame side members 10. Positioned within the main frame members 10 and extending longitudinally with respect thereto at substantially 30 degrees to the horizontal, are the husking rollers 11. Pivotally mounted at 12 to the main frame members 10 is a rocking frame 13. This rocking frame comprises two oppositely disposed arms 14 positioned on the outer sides of the vertical frame members 10. The arms 14 are held or tied together by a transversely extending tie-rod 15 which extends through arcuated apertures 16 formed in the oppositely disposed frame members 10. The apertures 16 are arranged concentrically with respect to the pivot 12 of the arms 14. The outer ends of the arms 14 are provided with upwardly extending portions 17. The outer ends of these portions 17 are provided with bearing apertures which are adapted to receive oppositely disposed bushings 18. The bushings 18 are provided with square apertures 19 which are adapted to receive a square rock shaft 20. The outer ends of the bushings 18 are provided with enlarged flanges 21 to form bearing surfaces against the outer surfaces of the arms 14. The square shaft 20 as well as the bushings 18 are prevented from lateral displacement by means of cotters 22 secured to the outer ends of the shaft 20 as shown in Figs. 2 and 4. The rock shaft 20 extends through and is adjustable in slots 23 formed in the side frames 10. The rocking frame thus described is adjustable by means of connecting links 24 journaled to the bushings 18 on the opposite sides of the rock frame 13. The upper ends of the links 24 are pivotally connected to oppositely positioned cranks 25 secured to a transversely extending square shaft 26. The shaft 26 is pivotally mounted in oppositely disposed brackets 27 fixed to the opposite frames 10 by means of bolts 28. One of the brackets 27 is provided with a toothed sector 29 which is adapted to lock a detent and lever mechanism 30 in a plurality of positions of adjustment. The lever 30 is secured to the shaft 26 in any well known manner. One end of the rock shaft 20 is provided with an outwardly and downwardly extending crank 31. The free end of this crank arm is provided with an aperture 32. Pivotally connected to the crank 31 in the aperature 32 is a pitman 33. The rearward end of the pitman 33 is connected eccentrically at 34 to a drive sprocket 35. It will be seen from the above description that as the sprocket 35 is driven, a reciprocating motion is imparted to the crank 31 by means of the pitman 33 and thus the shaft 20 is oscillated through this mechanism. And it will also be understood from the above description that the rocking frame 13 may be adjusted to different positions by merely adjusting the detent and lever mechanism 30 to various notches in the segment and through the crank 25 and connecting links 24, the shaft 20 together with the arms 14 are adjusted in the slots 23 of the frame 10 about the pivot 12 of the rocking frame.

My improved agitators and retarders are positioned over the rollers and spaced at intervals between the frame members 10. These agitators and retarders comprise a plurality of of longitudinally extending bars 36 secured intermediate their ends to the rock shaft 20 by means of a bracket 37 and bolts 38. The outer ends of the bars 36 are provided with apertures 39 which are adapted to slidably receive reciprocating rods 40. The rods 40 are resiliently connected to the bars 36 by compression springs 41 and cotters 42. The lower ends of the rods 40 are pivotally connected at 43 to the forwardly inclined agitators and retarders 44. The forward set of agitators and retarders 44 have their rearward ends 45 pivotally connected to the tie-rod 15 while the rearward agitators and retarders have their rear ends 46 pivotally connected on a transversely extending rod 47 secured to the frame members 10.

In the operation of the above described device, it will be understood that the sprocket 35 is driven from other operative parts of the husking machine and that through the medium of the pitman connection 33 and crank 31 and the rock shaft 20, the rock shaft is oscillated. This oscillation is imparted to the plurality of longitudinally extending bars 36 which in turn imparts this movement to the retarders and agitators 44, and by reason of the springs 41 connecting the links 40 to the bars 36, a resilient connection is formed between these oscillating members and retarders and agitators. By reason of the construction above described, a great variation or large accumulation of the ears of corn fed to the husking rolls will correct itself as this mechanism will yield and adjust itself to a variety of conditions. By the above arrangement, a very simple and economical construction is provided in that the retarders and agitators are combined in one device, and operate more efficiently in guiding, retarding, agitating and aligning the corn parallel to the axes of the rollers.

While in the above specification, I have described but one embodiment which my invention may assume in practice, it will be understood that the same is capable of modification and that modification may be made without departing from the spirit and scope of the invention as expressed in the following claims.

What I claim as my invention and desire to secure by Letters Patent is:

1. In a corn handling machine, a frame including spaced side frame members, corn treating rolls mounted in the frame between the side members, a rock shaft supported over the rolls by arms pivoted to the side frame members, agitators carried on the rock shaft for cooperation with the rolls, means for rocking the rock shaft to operate the agitators, and a lever and detent mechanism carried by one of the side frame members and connected to the rock shaft for adjusting it and the agitators toward or away from the rolls while the same are in operation.

2. In a corn handling machine, a frame including spaced side frame members, corn treating rolls mounted in the frame between the side members, a rock shaft supported over the rolls by arms pivoted to the side frame members, a plurality of bars fixed intermediately of their ends to the rock shaft, agitator members carried at opposite ends of the bars, the agitators being resiliently connected to the bars and pivotally connected to a pair of transverse rods carried by the side frame members, and means for rocking the rock shaft whereby the agitators cooperate with the rolls.

3. In a corn handling machine, a frame including spaced side frame members, corn treating rolls mounted in the frame between the side members, a rock shaft supported over the rolls and journaled in slots in the side frame members, arms pivoted to the side frame members and supporting the rock shaft in the slots, agitators connected to the rock shaft and pivoted to rods carried in the side frame members, and means for adjusting the rock shaft and agitators with respect to the rolls during the operation thereof.

4. In a corn handling machine, a frame including spaced side frame members, corn treating rolls mounted in the frame between the side members, arms pivoted to the side frames for supporting a rock shaft over the rolls, the rock shaft being journaled in slots in the side frames, agitators resiliently connected to the rock shaft and at one end pivotally connected to rods carried in the side frames, and a lever mechanism connected to the rock shaft and supported on the frame for adjusting the agitators with respect to the corn treating rolls during the operation thereof.

5. In a corn handling machine, a frame including spaced side frame members, corn treating rolls mounted in the frame between the side members, a rock shaft journaled in the side members, two rods carried in the side frames parallel with the rock shaft and spaced from each other and from the rock shaft, cross bars connected intermediately of their ends to the rock shaft, depending members connected to the ends of the cross bars, combined agitator and retarder members pivoted intermediately of their ends to the depending members and at one end to the rods in the side frames, and means for rocking the rock shaft to operate said combined agitator and retarder members to cooperate with the corn treating rolls.

6. In a corn handling machine, a frame including spaced side frame members, corn treating rolls mounted in the frame between the side members, a rock shaft journaled in the side members, two rods carried in the side frames parallel with the rock shaft and spaced from each other and from the rock shaft, cross bars connected intermediately of their ends to the rock shaft, depending resilient members slidably connected to the ends of the cross bars, combined agitator and retarder members pivoted to the depending members, half of these members being pivoted at one end to one of the rods in the side frame and the other half to the other rod in the side frame, and means for rocking the rock shaft to operate said agitator and retarder members for cooperation with the corn treating rolls.

7. In a corn handling machine, a frame including side frame members, corn treating rolls mounted in the frame between said side frame members, a transverse rod connecting the side frames, an arm adjacent each side frame pivoted at one end to the rod, a rock shaft journaled in the other end of the arms and arranged in the side frames parallel with the rod, another rod connecting the arms intermediately of their ends and arranged in the side frames between the rock shaft and the other rod, cross bars fixed intermediately of their ends to the rock shaft, combined agitator and retarder members connected to the ends of the cross bars, those at one end being pivoted to one of the rods and those at the other end being pivoted to the other rod, and means for rocking the rock shaft to operate the agitator and retarder members in cooperation with the treating rolls.

8. In a corn handling machine, a frame including side frame members, corn treating rolls mounted in the frame between said side frame members, a transverse rod connecting the side frames, an arm adjacent each side frame pivoted at one end to the rod, a rock shaft journaled in the other end of the arms and arranged in the side frames parallel with the rod, another rod connecting the arms intermediately of their ends and arranged in the side frames between the rock shaft and the other rod, cross bars fixed intermediately of their ends to the rock shaft, combined agitator and retarder members resiliently connected to the ends of the cross bars, those at one end being pivoted to one of the rods and those at the other end being pivoted to the other rod, means for rocking the rock shaft to operate the agitator and retarder members, and means for adjusting the rock shaft to position the agitator and retarder members closer to or farther from the treating rolls.

In testimony whereof I affix my signature.

MARTIN SWANSON.